US009100706B2

(12) United States Patent
Sim et al.

(10) Patent No.: US 9,100,706 B2
(45) Date of Patent: Aug. 4, 2015

(54) METHOD AND SYSTEM FOR CUSTOMISING LIVE MEDIA CONTENT

(75) Inventors: Wong Hoo Sim, Singapore (SG); Teck Chee Lee, Singapore (SG)

(73) Assignee: Creative Technology Ltd, Singapore (SG)

( * ) Notice: Subject to any disclaimer, the term of this patent is extended or adjusted under 35 U.S.C. 154(b) by 917 days.

(21) Appl. No.: 12/676,887

(22) PCT Filed: Sep. 4, 2008

(86) PCT No.: PCT/SG2008/000328
§ 371 (c)(1),
(2), (4) Date: Mar. 5, 2010

(87) PCT Pub. No.: WO2009/031975
PCT Pub. Date: Mar. 12, 2009

(65) Prior Publication Data
US 2010/0253764 A1 Oct. 7, 2010

(30) Foreign Application Priority Data
Sep. 5, 2007 (SG) ................ 200706517-0

(51) Int. Cl.
*H04N 7/00* (2011.01)
*H04N 21/4728* (2011.01)
*G06T 3/00* (2006.01)
*H04N 21/2187* (2011.01)
*H04N 21/6587* (2011.01)

(52) U.S. Cl.
CPC .......... *H04N 21/4728* (2013.01); *G06T 3/0006* (2013.01); *H04N 21/2187* (2013.01); *H04N 21/6587* (2013.01)

(58) Field of Classification Search
None
See application file for complete search history.

(56) References Cited

U.S. PATENT DOCUMENTS

| | | | | |
|---|---|---|---|---|
| 5,745,126 | A * | 4/1998 | Jain et al. ..................... | 382/154 |
| 6,924,832 | B1 * | 8/2005 | Shiffer et al. .................. | 348/36 |
| 6,937,266 | B2 * | 8/2005 | Rui et al. ................... | 348/14.05 |
| 2001/0045978 | A1 * | 11/2001 | McConnell et al. ........... | 348/42 |
| 2006/0033813 | A1 | 2/2006 | Provinsal et al. | |
| 2007/0022447 | A1 | 1/2007 | Arseneau et al. | |
| 2007/0103543 | A1 * | 5/2007 | Anderson et al. .............. | 348/36 |
| 2007/0189708 | A1 * | 8/2007 | Lerman et al. .................. | 386/52 |
| 2007/0204287 | A1 * | 8/2007 | Conradt et al. ................. | 725/28 |
| 2007/0300273 | A1 * | 12/2007 | Turner ......................... | 725/105 |

OTHER PUBLICATIONS

"The HotMedia architecture: progressive and interactive rich media for the internet"; K.G. Kumar, J.S. Lipscomb, A. Ramchandra, S.S.P. Chang, W.L. Gaddy, R.H. Leung, S. Wood, L-J Zhang, J. Chen, J.P. Menon; IEEE Transactions on Multimedia, vol. 3, Issue 2, Jun. 2001, pp. 253-267.

* cited by examiner

*Primary Examiner* — Sath V Perungavoor
*Assistant Examiner* — Kate Luo
(74) *Attorney, Agent, or Firm* — Russell Swerdon; Desmund Gean

(57) ABSTRACT

There is provided a method of customizing live media content with the live media content including at least one dewarped panoramic view of a monitored area. The panoramic view may have a plurality of portions for selection by a user, the method comprising: receiving the live media with audio and video interleaved and/or compressed as a single stream data, receiving a selection of one of the plurality of portions of the panoramic view; and customizing the live media based on the selection of the a portion of the panoramic view for display. A system to customize live media content is also disclosed.

9 Claims, 2 Drawing Sheets

METHOD AND SYSTEM FOR CUSTOMISING LIVE MEDIA CONTENT

BACKGROUND AND FIELD OF THE INVENTION

This invention relates to a method and system for customising live media content.

In this information age, the convergence of telecommunications, broadcasting and information technology has blurred the dichotomy between content and carrier. Specifically, telecommunications infrastructure is now being used to broadcast multimedia content when traditionally it has been used solely for voice applications. Likewise, technology has also allowed a multitude of applications over the internet such as VoIP and video streaming. As such, there are now multiple ways of broadcasting to the masses which are accessible for use by the masses. However, more can be done to make such content more appealing to end users, especially since each user typically has varying preferences and tastes which may fluctuate with trends and fads.

It is an object of the present invention to provide a method and apparatus for customising live media content which provides the masses with a useful choice.

SUMMARY OF THE INVENTION

In a first aspect, there is provided a method of customising live media with the live media including at least one dewarped panoramic view of a monitored area. The panoramic view may have a plurality of portions for selection by a user, the method comprising: receiving the live media with audio and video interleaved and/or compressed as a single stream data, receiving a selection of one of the plurality of portions of the panoramic view; and customising the live media based on the selection of the a portion of the panoramic view for display. The user may be a designated content selector/arranger. The user may further editing/amending/changing the content of the live media.

It is preferable that the at least one panoramic view is either 180° or 360° of the monitored area.

Advantageously, the single stream data includes access control which restricts the content of the live media, and the method further comprises authenticating to determine access rights, and releasing the content of the live media if access rights are granted.

It is also advantageous that when the selected portion of the panoramic view includes a moving object, the method further comprising configuring the selected portion to track the moving object within the monitored area.

The method may preferably further comprise adding/replacing and playing an audio input of choice with the audio input being, for example, music, sound effects, ambience mood music, voice commentary and so forth.

The method may also preferably further comprise adding visual indicia to the selected portion of the panoramic view and displaying the visual indicia together with the selected portion of the panoramic view, the visual indicia being for example, text in a plurality of fonts, animated effects, video effects or icons and so forth. It may be advantageous that the visual indicia includes hyperlinking which directs the user to another portion of the stream.

The method may advantageously include storing/retransmitting the customised live media as digital files which are able to be played back on devices, There is also provided a system for customising live media, the live media including at least one dewarped panoramic view of a monitored area. The panoramic view may have a plurality of portions for selection by a user and the system may comprise a receiver for receiving the live media with audio and video interleaved and/or compressed as a single stream data, a processor for receiving a selection of one of the plurality of portions of the panoramic view, with the processor being configured to customise the live media based on the selection of a portion of the panoramic view for display. The system may preferably be incorporated in a portable media player, the player being another aspect of the present invention.

BRIEF DESCRIPTION OF THE DRAWINGS

An embodiment of the invention will now be described, by way of example, with reference to the accompanying drawing in which.

DETAILED DESCRIPTION OF THE PREFERRED EMBODIMENT

Figure 1:
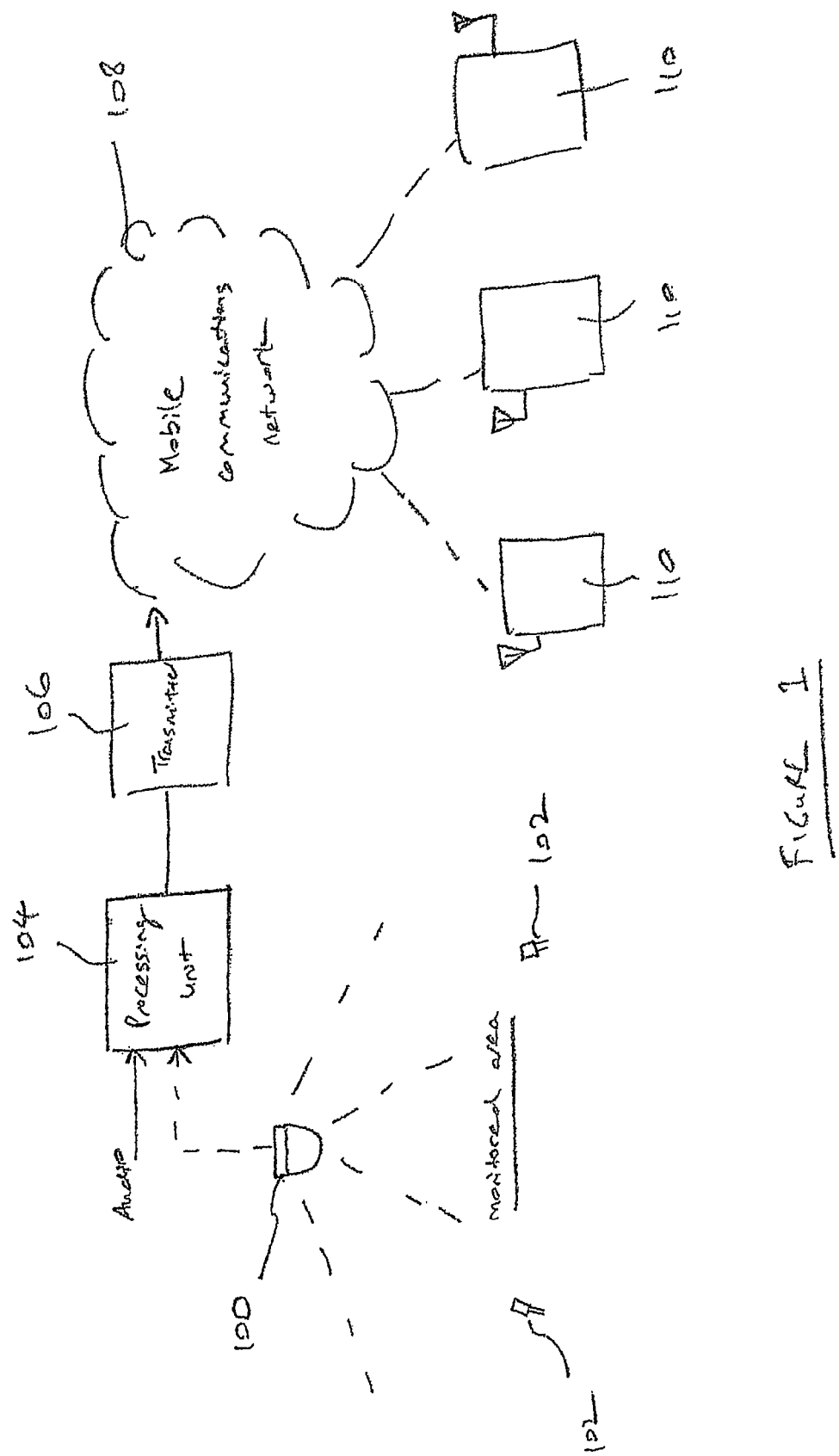
FIG. 1 is a block diagram showing a preferred embodiment of this invention.

FIG. 1 shows an overview of an application of a preferred embodiment of this invention in which a video camera 100 having a high-resolution fish-eye lens or wide-angle lens is used to capture panoramic video images of a monitored area. An example of such a video camera 100 is available from www.grandeye.com and the website also has exemplary images of 180° and 360° panoramic images. It is preferable that the video camera 100 is employed in the capture of live images.

Interactivity with such panoramic video images is known such as described in U.S. Pat. No. 6,243,099 and U.S. Pat. No. 6,271,853 and it is possible to select portions of a panoramic image for close-up views. These close-up views may include motion tracking such that an object that is subject to the close-up view may be tracked even if the object is not stationary. However, the original panoramic video image captured is skewed, especially around the edges of the image and thus, it is necessary to dewarp the panoramic video image in order for a user to discern the content of the panoramic video image such that the user is able to discern which portions of the image are of interest to the user. Dewarping may include performing a rectilinear transform on the skewed panoramic video image.

However, for certain applications, it is not sufficient to capture just video images and it is also necessary to receive sounds associated with the monitored area. For example, if the video camera 100 is used to capture images of a live audience, the sounds produced by the audience may be necessary to give effect to the captured images. This is true, for example, if the video camera is used to capture a bird's eye view of a stadium hosting a football match, the sounds of the spectators would enhance the entertainment value of the captured images which may lead to a more immersive experience for the user in relation to the user's perception of the captured images. Thus, in the preferred embodiment, one or more microphones 102 are placed in strategic locations to receive sounds or audio from the monitored area.

The captured sounds and video are channelled wirelessly to a processing unit 104, although wired means may be used, and might be preferred, depending on application.

The processing unit 104 processes the live sounds/audio and the live panoramic video image by interleaving and/or compressing the audio and video data in a single stream for live transmission by a transmitter 106 to receiving devices. The video data may be in either conventional resolution or high definition format. The processing unit 104 will need to process more data for video in a high definition format.

It should be appreciated that the video data may be captured in only high definition format, and the video data is downscaled to conventional resolution at the processing unit 104 if the receiving device is unable to support video in a high definition format. The processing unit 104 may determine a capability of each receiving device by sending a query to each receiving device and subsequently receiving responses from each receiving device. The video data consequently transmitted to each receiving device is streamed to each receiving device in accordance with the response received at the processing unit 104 from each receiving device.

The transmission to the receiving devices may be via any suitable communications network and in this embodiment, a mobile communications network 108 is used and the receiving devices are portable media players 110 communicatively coupled to the network 108. The mobile communications network 108 may include any network which facilitates/enables transmission of data. However, it should be noted that the receiving devices are not limited to portable media players 110 and may include other computing devices such as, for example, mobile phones, notebook computers, PCs and the like. The transmission to the receiving devices may also be via a peer-to-peer network as described in U.S. Pat. No. 6,901,604.

Each of the portable media players 110 includes a receiver for receiving the single stream live media and a processor for converting the data stream into multimedia content for playback by each media player 110. Conventionally, a user of a portable media player is restricted by what is transmitted by the source but the processor of the portable media player 110 of the preferred embodiment allows the user to customise or interact with the multimedia content that is being played.

The customisation/interaction of the multimedia content takes the following forms:

1) Selection of Portions within the Video Image

Using the example of a football match being the monitored area, the user can select a section of the pitch to view, rather than the 360° bird's eye view. The user may be a designated content selector/arranger for a pre-determined grouping of users, and may solely determine content being viewed by others in the grouping of users. The grouping of users may be based on voluntary entry into a grouping either by payment of a fee or otherwise. The status of a user is (eg. full content selection/arrangement rights, limited content selection/arrangement rights, no content selection/arrangement rights, and so forth), either may be based on a level of fee payment or may be based on a type of the receiving device (eg. devices with less processing capability may be unable to select/arrange content).

Since the panoramic video image shows an entire view of the monitored area, each user of a plurality of portable media players 110 is able to view a particular section of the pitch in accordance to each user's preference if each user possesses full content selection/arrangement rights. Each user with either full or limited content selection/arrangement rights may choose to, for example, view the panoramic video image, constantly monitor a particular section of the pitch, switch views to different sections of the pitch, and so forth. The (de-warped) panoramic video image that is transmitted in the single media stream is able to support the five viewing of an infinite number of different sections of the pitch by a plurality of users with the portable media players 110. This is because each frame of the panoramic video image is able to include adequate resolution to allow each of the plurality of users with the portable media players 110 to zoom-in to a section of the pitch without pixilation of the zoomed-in section of the pitch. As such, the user may be able to pan and zoom to different sections of the panoramic video image. Split screen views of the different sections of the monitored area may also be shown on the portable media players 110. It should be appreciated that the split screen view is composed at the processing unit 104 and transmitted as a single media stream to the portable media player 110. This is advantageous as the portable media player 110 may not possess adequate processing capability to receive and playback multiple media streams.

Access to specific sections of the monitored area may be restricted by a provider of the panoramic video image. The specific sections which have restricted access may be covered by, for example, a black box, a mosaic-ed view of the specific section, a box showing some form of advertising and the like. Only users of portable media players 110 with either a "key (s)" or an access privilege(s) may gain access to the specific sections of the monitored area. Either the "key(s)" or the access privilege(s) may be associated to a user or may reside in the portable media player 110. The "key(s)" may be used in an authentication process (virtual handshake process or may include more complex encryption/biometric identification processes). These "key(s)" and/or access privilege(s) may be provided to users who have provided consideration (monetary or otherwise) to the provider of the panoramic video image for access to the specific sections of the monitored area.

Figure 2:
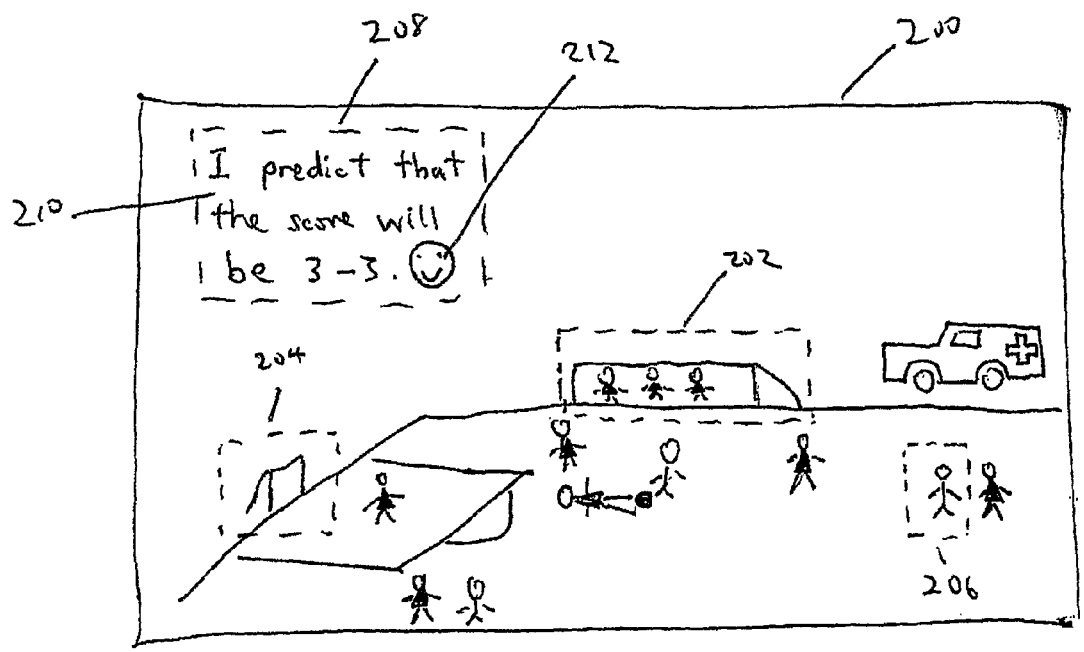
FIG. 2 is a representative view used to illustrate an aspect of the invention.

Referring to FIG. 2, there is shown a representative image 200 of a football match being transmitted to the portable media players 110. A first portion 202 of the image 200 is at a team dug-out of one of the teams. A second portion 204 of the image is a goal area of one of the teams.

2) Motion Tracking

Using another example of a beach volleyball match being the monitored area, the user with full content selection/arrangement rights may be interested to monitor one of the players and may not only be interested in the volleyball match per se. This function allows the user to select which player to track so that the processing unit 104 tracks and shows the movement of this player for display on the portable media player 110. Since the panoramic video image shows an entire view of the monitored area, each user of a plurality of portable media players 110 is able to view a particular player or even a ball in accordance to each user's preference. Each user may choose to constantly monitor a moving object, switch views to view different moving objects, or even have split screen views of different aspects of the monitored area. It should be appreciated that the split screen view is composed at the processing unit 104 and transmitted as a single media stream to the portable media player 110. This is advantageous as the portable media player 110 may not possess adequate processing capability to receive and playback multiple media streams.

The panoramic video image that is transmitted in the single media stream is able to support the live viewing of an infinite number of different numbers of moving objects by a plurality of users with the portable media players 110. This is because each frame of the panoramic video image is able to include adequate resolution to allow each of the plurality of users with the portable media players 110 to zoom-in to the moving object and track the movements of the moving object without pixilation of the zoomed-in moving object.

The monitoring of a moving object may also be restricted by the provider of the panoramic video image. The moving object which have restricted access may be covered by, for example, a moving black box, a mosaic-ed view of the moving object, a moving box showing some form of advertising and the like. Only users of portable media players 110 with a either a "key(s)" or an access privilege(s) may be able to monitor the moving objects. The "key(s)" may be associated to a user or may reside in the portable media player 110. Either the "key(s)" or the access privilege(s) may be used in an authentication process (virtual handshake process or may include more complex encryption/biometric identification processes). The "key(s)" or the access privilege(s) may be provided to users who have provided consideration (monetary or otherwise) to the provider of the panoramic video image so as to gain access to monitor the moving objects.

Referring to FIG. 2, portion 206 is on a player and movements of the player may be tracked by the user.

3) Customisation of Audio

The portable media player 110 also allows the user to incorporate an audio input of choice (soundtrack) when viewing the video image. For example, if the user does not wish to listen to the original sounds picked up from the monitored area or would like to include additional audio inputs in addition to the original sounds, the user can choose to use, for example music, sound effects, ambience mood music, voice commentary and the like. The portable media player 110 may include at least one database of music, sound effects, ambience mood music and the like in varying file formats. The user may be able to incorporate the audio input at any time while viewing the video image. In relation to voice commentary, the user may utilise a microphone included with the portable media player 110 to record the voice commentary (possibly as a *.wav file) and simultaneously incorporate the commentary with the video image.

It should be appreciated that only users with full content selection/arrangement rights are able to incorporate the commentary with the video image and transmit onto others. The voice commentary may be packaged with the video image at the processing unit 104, and transmitted to other portable media players 110 for consumption by the respective users of the portable media players 110. The audio input of choice may be tagged to the video image in relation to junctures of time. Thus, the user is able to view the video image together with at least one self-defined audio input of choice.

4) Inclusion of Visual Indicia

The portable media player 110 also allows the user to incorporate visual indicia of choice when viewing the video image. For example, if the user wishes to alter a visual appearance of a portion of the monitored area, the user can choose to include visual indicia of his choice, for example text, animated effects, video effects, icons, and the like. The portable media player 110 may include at least one database of text fonts, animated effects, video effects, icons, and the like. The user may be able to incorporate the visual indicia at any time while viewing the video image. The user may utilise at least one input device included with the portable media player 110 to compose/select the visual indicia and simultaneously incorporate the visual indicia with the video image. Thus, the user is able to view the video image together with at least one self-defined visual indicia of choice. The visual indicia may also include hyperlinking which may direct the user to another portion of the stream.

Referring to FIG. 2, portion 208 shows an example of text 210 and an icon 212 being included in the video image.

The portable media player 110 also has storage means that enables the customised/post-interaction received images to be stored for playback or retransmission. The customised/post-interaction received images may be stored or retransmitted as digital files which may also be played back on devices other than the portable media player 110, such as, for example, older generation media players which have lesser processing capabilities.

With the preferred embodiment, a user can have full control over what he wants to see and hear allowing entertainment to reach new heights.

The described embodiment should not be construed as limitative. For example, the monitored area may be any area depending on application. For example, if the described embodiment is used in a reality TV, then the monitored area may be the venue of the show.

Having now fully described the invention, it should be apparent to one of ordinary skill in the art that many modifications can be made hereto without departing from the scope as claimed.

The invention claimed is:

1. A method of customising live media content, the method comprising:
    receiving the live media content which includes at least a dewarped panoramic view of a monitored area and access control which restricts the content of the live media;
    selecting at least a portion of the monitored area in accordance with the preference of a selector/arranger; and
    customising the live media based on the selected at least a portion of the monitored area for display by at least one user associated with the selector/arranger,
    wherein the at least one user associated with the selector/arranger has a full content selection/arranger rights,
    wherein a group of users is associated with the selector/arranger and each user in the group of users is a user of a receiving device which is separate from other users in the group of users for receiving the customized live media,
    wherein the status of a user includes full content selection/arrangement rights, limited content selection/arrangement rights, and no content selection/arrangement rights based on either a level of agreement or a type of receiving device, and
    wherein customizing the live media comprises either editing the live media content, tracking a moving object in the selected portion of the monitored area, or adding audio input into the live media.

2. The method as in claim 1, wherein the selector/arranger solely determines content being viewed by users in the group of users.

3. The method as in claim 1, wherein grouping of users is based on voluntary entry.

4. The method as in claim 1, wherein the selected at least a portion of the monitored area includes a moving object.

5. The method as in claim 4 further comprising tracking the moving object.

6. The method as in claim 1, wherein the receiving device includes a receiver to receive a live transmission of the customized live media.

7. A system for customising live media content, the system comprising:
    a receiver for receiving the live media content which includes at least a dewarped panoramic view of a monitored area and access control which restricts the content of the live media;
    a processor configurable for selecting at least a portion of the monitored area in accordance with the preference of a selector/arranger, the processor being further configurable for customizing the live media based on the selected at least a portion of the monitored area for display by at least one user associated with the selector/arranger, wherein the at least one user associated with the selector/arranger has a full content selection/arranger rights, wherein a group of users is associated with the selector/arranger and each user in the group of users is a user of a receiving device which is separate from other users in the group of users for receiving the customized live media, wherein the status of a user includes full content selection/arrangement rights, limited content selection/arrangement rights, and no content selection/arrangement rights based on either a level of agreement or a type of receiving device, and wherein customizing the live media comprises either editing the live media content, tracking a moving object in the selected portion of the monitored area, or adding audio input into the live media.

8. The system as in claim 7, wherein the live media content is provided by a provider and access to at least one section of the monitored area is restricted by the provider.

9. The system as in claim 7, wherein the receiving device includes a receiver to receive a live transmission of the customized live media.

* * * * *